United States Patent
Lo et al.

(10) Patent No.: US 9,630,708 B2
(45) Date of Patent: Apr. 25, 2017

(54) AIRCRAFT LANDING GEAR WHEEL-DRIVE SYSTEM

(71) Applicant: HONEYWELL INTERNATIONAL INC., Morristown, NJ (US)

(72) Inventors: Charles Lo, Peoria, AZ (US); Allan Steves, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 13 days.

(21) Appl. No.: 14/839,065

(22) Filed: Aug. 28, 2015

(65) Prior Publication Data
US 2017/0057624 A1    Mar. 2, 2017

(51) Int. Cl.
*B64C 25/40* (2006.01)
*B64C 25/42* (2006.01)
*B60W 30/18* (2012.01)

(52) U.S. Cl.
CPC ..... *B64C 25/405* (2013.01); *B60W 30/18127* (2013.01); *B64C 25/42* (2013.01); *B60T 2270/60* (2013.01)

(58) Field of Classification Search
CPC .................................................. B64C 25/405
See application file for complete search history.

(56) References Cited

U.S. PATENT DOCUMENTS

| | | | |
|---|---|---|---|
| 8,267,350 B2 | 9/2012 | Elliott et al. | |
| 8,684,300 B2 | 4/2014 | Wilson et al. | |
| 9,193,449 B2* | 11/2015 | Cox | B64C 25/405 |
| 9,334,047 B2* | 5/2016 | Cox | B64C 25/405 |
| 2007/0158497 A1 | 7/2007 | Edelson et al. | |
| 2011/0084550 A1 | 4/2011 | Nierlich et al. | |
| 2014/0336847 A1* | 11/2014 | Cox | B64C 25/405 |
| | | | 701/3 |
| 2015/0045167 A1* | 2/2015 | Lee | F16H 47/04 |
| | | | 475/72 |
| 2015/0142214 A1* | 5/2015 | Cox | G05D 1/0083 |
| | | | 701/3 |
| 2015/0203193 A1* | 7/2015 | Cox | B64C 25/405 |
| | | | 701/2 |
| 2016/0349752 A1* | 12/2016 | Fusaro | B64F 1/002 |

* cited by examiner

*Primary Examiner* — Joseph W Sanderson
(74) *Attorney, Agent, or Firm* — Shimokaji IP

(57) ABSTRACT

An aircraft landing gear wheel-drive system includes a first wheel drive unit for driving a first landing gear wheel of the aircraft and a second wheel drive unit for driving a second landing gear wheel of the aircraft. The first wheel drive unit has a first range of torque to speed (T/S) ratios. The second wheel drive unit has a second range of T/S ratios. The first range of T/S ratios is greater than the second range of T/S ratios.

8 Claims, 7 Drawing Sheets

AIRCRAFT LANDING GEAR WHEEL-DRIVE SYSTEM

BACKGROUND OF THE INVENTION

The present invention generally relates to aircraft landing gear. More particularly, the invention relates to landing gear with integrated drive systems to propel an aircraft during taxiing.

A typical aircraft may taxi on to and from runways with thrust force developed by its engines. A significant amount of fuel may be burned by the engines during a typical aircraft taxi profile before and after each flight. In many cases, the main engines may provide more motive force than is required to complete a successful taxi profile. In that regard, engine-thrust taxiing may be considered inefficient and may contribute to high fuel costs and ground level emissions.

Aircraft designers have sought a more efficient method for propelling an aircraft during taxiing. Electric taxi systems (ETS) have been proposed to provide higher efficiency. A typical ETS may be implemented by using electrical motors to drive main landing gear wheels for aircraft taxiing. While this general ETS concept holds promise for improved efficiency, there are practical application problems that need to be addressed. Designers have been faced with the challenge of constructing a main landing gear ETS as a small and light-weight unit which may be positioned on main landing gear without a requirement to substantially modify the operational features or size of the landing gear. Additionally, designers have sought to include multiple operational features into the ETS unit. For example, it has been a design goal to incorporate into the ETS unit a capability for forward and reverse aircraft movement, safe braking after reverse aircraft movement, high torque for initial movement of the aircraft, and high speed for normal taxiing. These design goals relating to a multiplicity of operational features often conflict with the design goal of constructing an ETS unit that is compact and light-weight.

As can be seen, there is a need for an aircraft landing gear wheel-drive system which may incorporate a multiplicity of features such as a capability for forward and reverse aircraft movement, safe braking after reverse aircraft movement, high torque for initial movement of the aircraft, and high speed for normal taxiing. Additionally there is a need for an aircraft landing gear wheel-drive system which may only minimally impact existing aircraft structures and weight, (e.g., landing gear, landing gear doors, and wheel well configuration).

SUMMARY OF THE INVENTION

In one aspect of the present invention, an aircraft landing gear wheel-drive system comprises: a first wheel drive unit for driving a first landing gear wheel of the aircraft; and a second wheel drive unit for driving a second landing gear wheel of the aircraft, wherein the first wheel drive unit has a first range of torque to speed (T/S) ratios, wherein the second wheel drive unit has a second range of T/S ratios, and wherein the first range of T/S ratios is greater than the second range of T/S ratios.

In another aspect of the present invention, a method for moving an aircraft at ground level comprises: driving nose wheels of the aircraft with a nose wheel drive unit mounted on board the aircraft to initiate ground level movement of the aircraft; and driving main landing gear wheels of the aircraft, with a main gear wheel drive unit mounted on board the aircraft, only after the aircraft is moving.

In still another aspect of the present invention, a taxi control unit for an aircraft landing gear wheel-drive system comprises; a REVERSE position; a NEUTRAL position; and a control device wherein movement of the control device from the NEUTRAL label toward the REVERSE position produces a signal to initiate reverse driving of a nose wheel drive unit, and wherein movement of the control device from the REVERSE position to the NEUTRAL position produces a signal to initiate modulated hydraulic flow to an accumulator from a hydraulic motor acting as a pump so that regenerative braking of a nose wheel of the aircraft occurs.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a landing gear wheel-drive system for an aircraft. The landing gear wheel-drive system may employ electric motors positioned to drive main-landing gear wheels. An additional motor may be positioned to drive nose-landing gear wheels. In other words, the landing gear wheel drive system may be considered to be a separated drive system. Advantageously, the nose wheels may be driven under conditions which demand high torque delivered at relatively low speed, e.g., push-back or initial taxiing breakaway. The main landing gear wheel may be employed to taxi the aircraft when speed demands may be higher and torque demands may be lower.

Figure 1:
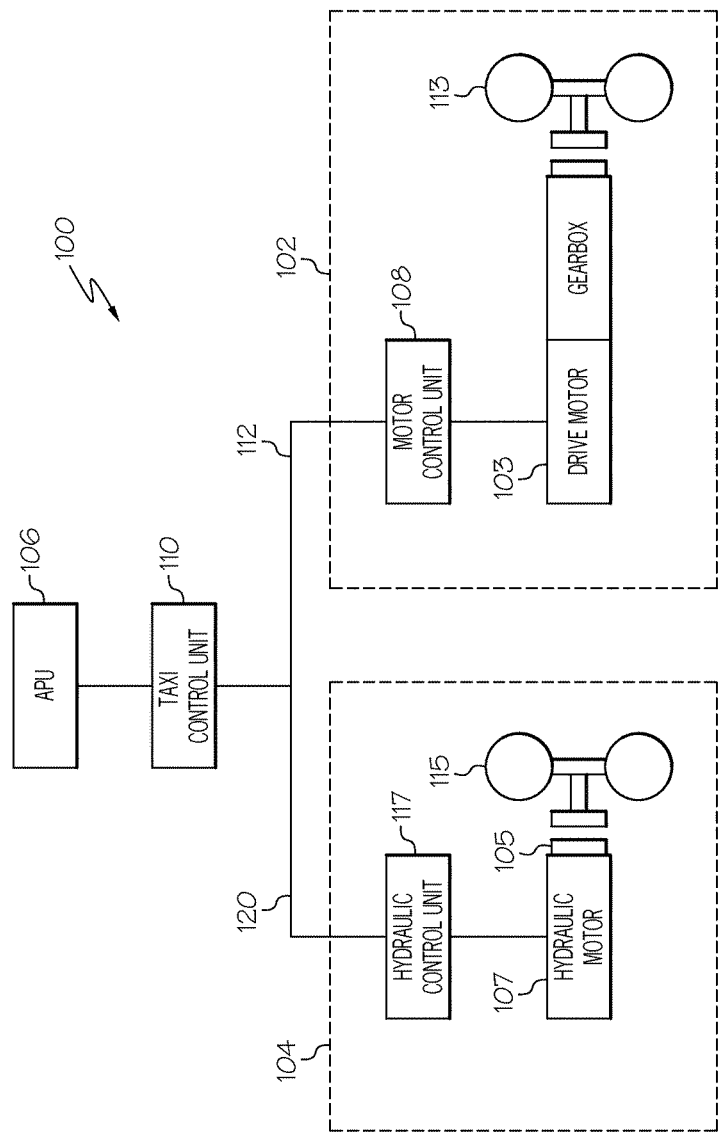
FIG. 1 is a schematic diagram of an aircraft landing gear wheel drive system in accordance with an exemplary embodiment of the invention.

Referring now to FIG. 1, an exemplary embodiment of a landing gear wheel-drive system 100 (hereinafter wheel-drive system 100) for an aircraft (not shown). The landing gear wheel-drive system 100 may be incorporated into the landing gear of the aircraft and thus may be considered to be an "on-board" system. The wheel-drive system 100 may include a main gear wheel drive unit 102 for driving main gear wheels 113 and a nose wheel drive unit 104 for driving nose wheels 115. The drive units 102 and 104 may be mounted on landing gear of the aircraft and may be considered to be "on-board" drive units 102 and 104. The nose wheel drive unit 104 may be provided with aircraft reversing capability. The main gear wheel drive unit 102 may not be provided with such aircraft reversing capability. In an exemplary embodiment, the main gear drive units 102 may include electrically powered motors 103, and the nose wheel drive unit 104 may include a hydraulic clutch 105 and a hydraulic motor 107. The nose wheel drive unit 104 may have a range of torque to speed (T/S) ratios that is greater than a range of T/S ratios of the main gear wheel drive unit 102. Thus, the nose wheel drive unit 104 may be employed to initiate taxiing movement of the aircraft and the main gear wheel drive unit 102 may engaged to taxi the aircraft after the aircraft has started moving.

The main gear wheel drive unit 102 may be provided with electrical power from an auxiliary power unit (APU) 106. Electrical power to the unit 102 may pass through a motor control unit 108. A taxi control unit 110 may be employed by a pilot to provide main gear control signals on a combined power and signal system 112 to the motor control unit 108.

Figure 2:
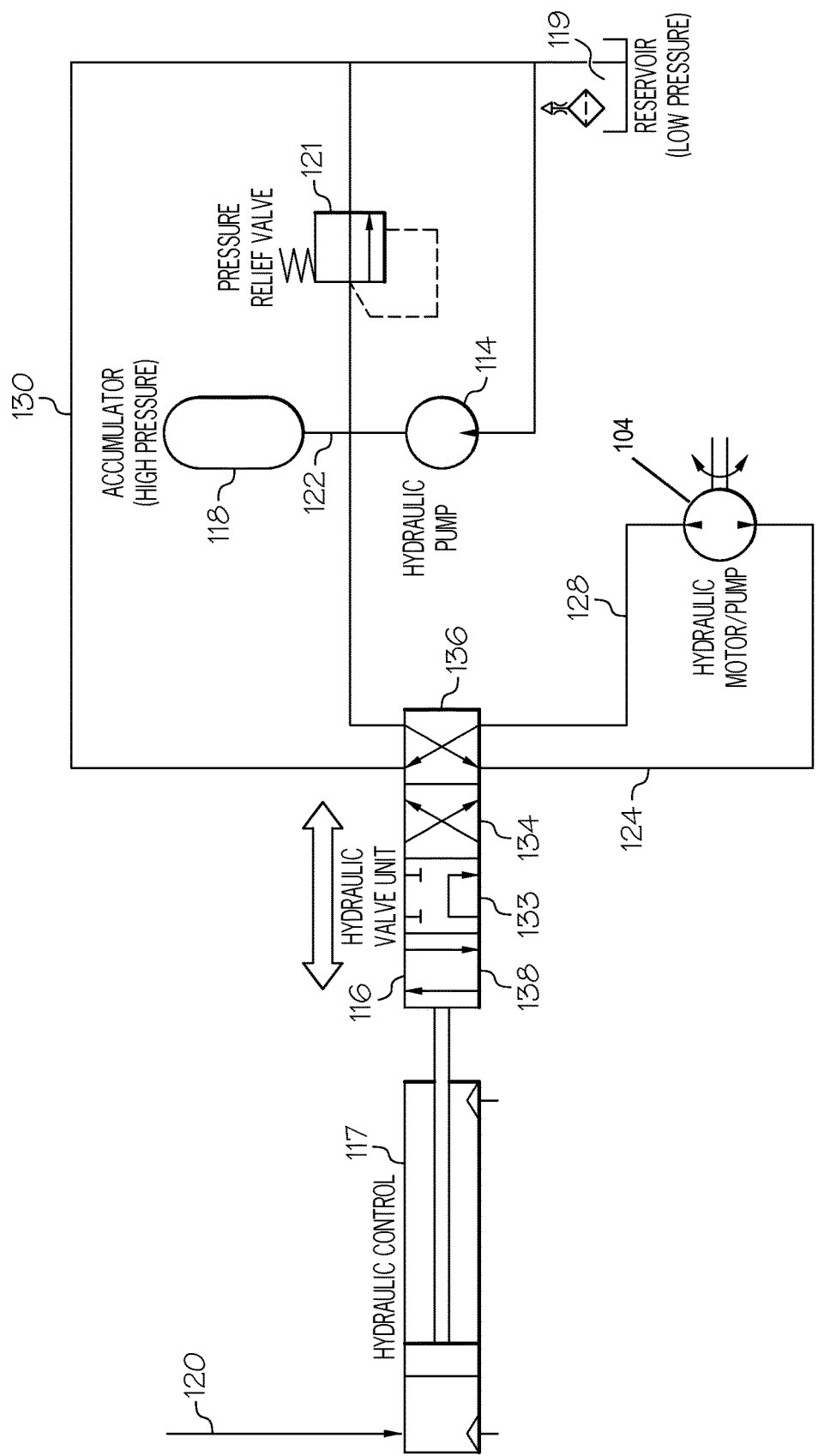
FIG. 2 is schematic diagram of a hydraulic system employed in the drive system of FIG. 1 in accordance with an exemplary embodiment of the invention.

Referring now to FIG. 2 along with FIG. 1, it may be seen that, a hydraulic pump 114 may be provided with power from the APU 106. Hydraulic power to the nose wheel drive unit 104 may pass through a hydraulic valve unit 116. A hydraulic accumulator 118 may be interconnected with the nose wheel drive unit 104 and the hydraulic pump 114. The taxi control unit 110 may be employed by the pilot to provide nose wheel control signals 120 to a hydraulic control unit 117. Hydraulic fluid may flow from the hydraulic pump 114 to the accumulator 118 along a flow path 122. A flow path 124 may transfer hydraulic fluid from the valve unit 116 to the nose wheel drive unit 104 for forward or reverse movement. A flow path 128 may transfer hydraulic fluid from the nose wheel drive unit 104 to the accumulator 118 for regenerative braking. A flow path 130 may transfer hydraulic fluid from the accumulator 118 to a low pressure reservoir 119.

The hydraulic control unit 117 may act responsively to the control signals 120 to direct hydraulic flow through various ports such as a forward port 136, a reverse port 138, a neutral port 133 and a regenerative, reverse braking port 134.

The nose wheel drive unit 104 may be provided with hydraulic-flow regenerative braking capability to stop reverse movement of the aircraft. When the valve control unit 116 is commanded to nose wheel reverse-movement braking status, the hydraulic control unit 117 may align the flow path 128 and the flow path 122 so that regenerative braking of the nose wheels 115 may occur because hydraulic fluid may be pumped by the nose wheel drive unit 104 into the accumulator 118.

If, at some point, the accumulator 118 has reached its maximum pressure set point, excess pressure may be relieved to the reservoir 119. When the aircraft has come to complete stop after reverse motion, the hydraulic valve unit 116 may move to neutral position unless immediate forward movement of the aircraft is desired.

Figure 3:
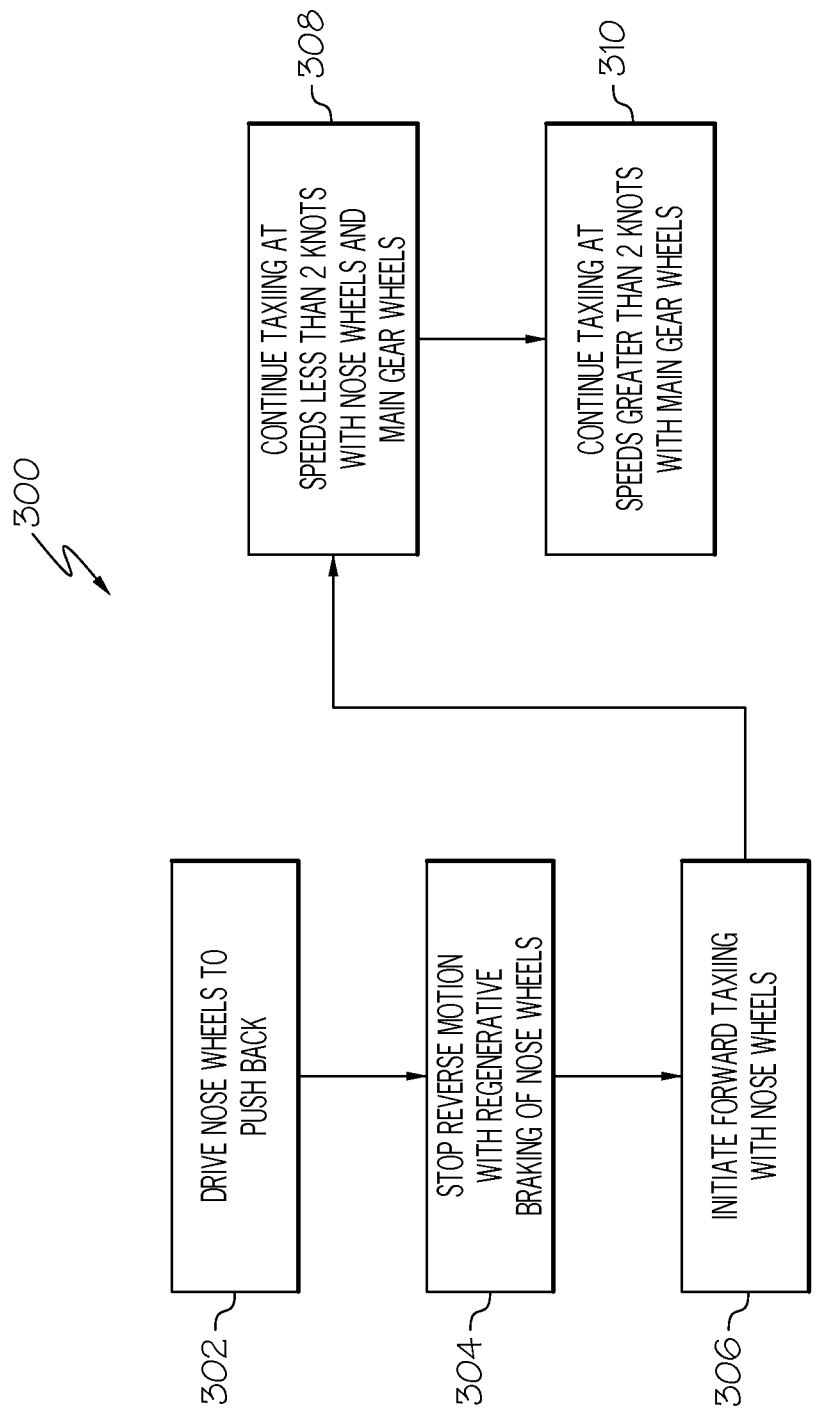
FIG. 3 is a flow chart of a method for taxiing an aircraft in accordance with an exemplary embodiment of the invention.

Referring now to FIG. 3, a flow chart may illustrate an exemplary embodiment of a method 300 for taxiing an aircraft in accordance with the present invention. In a step 302, the aircraft may be pushed back from a gate by driving only the nose wheels of the aircraft a with nose wheel drive unit that is on board the aircraft (i.e., the nose wheel drive unit 104 may be driven in reverse direction while the main gear wheel drive unit remains disengaged). In a step 304, the reverse motion of the aircraft may be stopped by regenerative braking of the nose wheels (i.e., hydraulic motor 107 of the nose wheel drive unit 104 may be operated as a pump so that rotation of the nose wheels forces hydraulic fluid into the accumulator 118 and recharges the accumulator 118). In a step 306, forward taxiing may begin by initially driving only the nose wheels with the nose wheel drive unit that is on board the aircraft (i.e., the nose wheel drive unit 104 may be driven in a forward direction while the main gear wheel unit 302 remains disengaged), In a step 308, forward taxiing may continue after initial forward movement of the aircraft by driving the nose wheels and main gear wheels with both a nose wheel drive unit and a main gear wheel drive unit, both of which drive units are on board the aircraft (i.e., the nose wheel drive unit 102 may continue driving the nose wheels, and the main gear wheel drive unit 102 may be engaged to drive main gear wheels in a forward direction). In a step 310, forward taxiing may continue at speeds above about 2 knots by driving only the main gear wheels with the main gear wheel drive unit that is on board the aircraft (i.e., main gear wheel drive unit 102 may continue to drive in a forward direction and nose wheel drive unit 104 may disengage from nose wheels).

It can be seen that some of the steps of the taxiing method 300 may be performed by the nose wheel drive unit 104 while other ones of the steps may be performed by the main gear wheel drive units 102. In other words, many desired features of taxiing functionality may be provided on the aircraft even though no single one of the drive units 102 or 104 may be required to perform all of the desired functional roles. As a result of allocation of functional roles, each of the drive units 102 and 104 may be constructed with a relatively compact configuration.

Referring now to FIGS. 1, 2 and 4 through 7, plan views of an exemplary embodiment of the taxi control unit 110 are shown and interactions with the drive system 100 are discussed.

Figure 4:
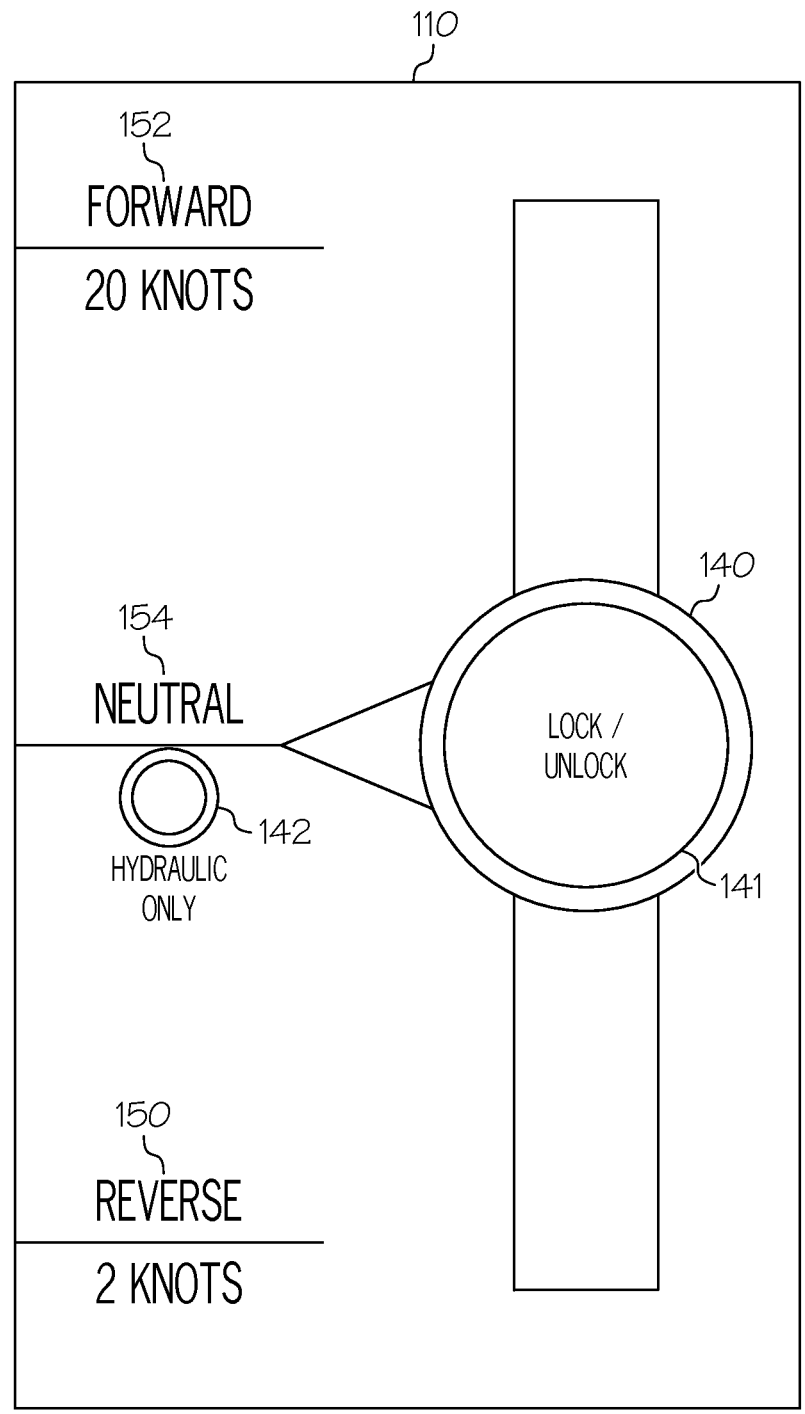
FIG. 4 is a plan view of a first configuration of a taxi control unit in FIG. 1 in accordance with an exemplary embodiment of the invention.
Figure 5:
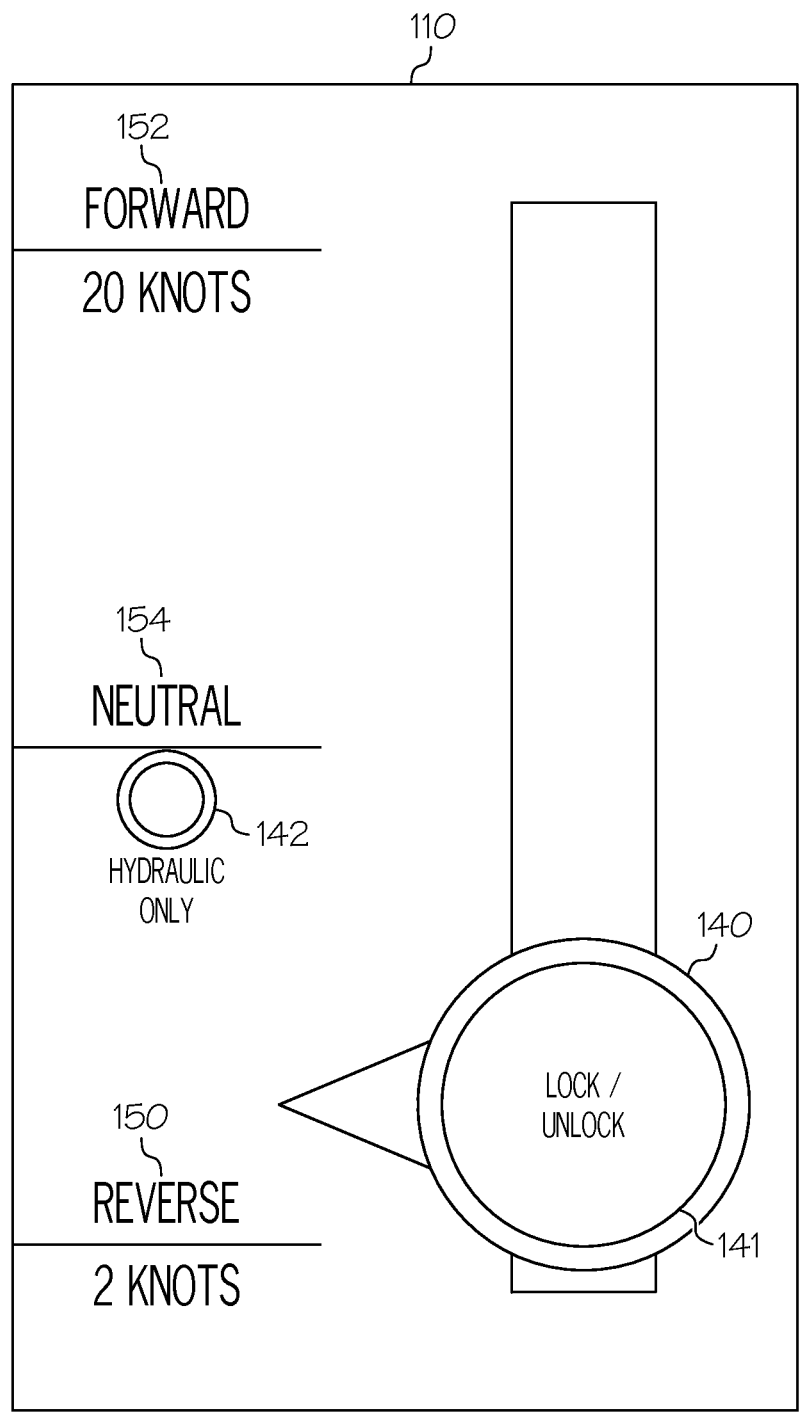
FIG. 5 is a plan view of a second configuration of a taxi control unit in FIG. 1 in accordance with an exemplary embodiment of the invention.

The taxi control unit 110 may include a control device 140 such as a handle or lever, a control lock 141, and a hydraulic-only selector button 142. In FIG. 4, the taxi control unit 110 is shown in a configuration that corresponds to the aircraft being ready for pushback. The control device 140 is shown positioned at a NEUTRAL position 154. Consequently the motor control unit 108 may be powered on, the hydraulic valve unit 116 may be in park position, the accumulator 118 may be charging, Referring particularly to FIGS. 4 and 5, the taxi control unit 110 is shown in configurations in which the aircraft may be moving in reverse (FIG. 5) during push back and then stopped by regenerative braking (FIG. 4). To initiate push back, the control device 140 may be moved to a REVERSE position 148. This action may produce a signal for actuating a hydraulic clutch 105 which may engage the nose wheel drive unit 104. The clutch 105 may be activated by unlocking the control device 140. The hydraulic valve unit 116 may modulate reversing flow according to traction control and position of the control device 140. In that regard the valve unit 116 may be considered to be a modulating valve unit. Slippage detection may be performed by comparing speed vectors between nose wheels and main gear wheels. The hydraulic pump 114 may produce pressure as required to maintain accumulator pressure. Set point for hydraulic accumulator pressure may decrease with increasing reversing speed. If proper traction cannot be established, an audio or visual signal may occur, indicating that a tug is needed.

Regenerative braking of the nose wheels 115 after pushback may begin when the control device 140 is returned to the NEUTRAL position 154 as shown in FIG. 4. The hydraulic motor 107 of the nose gear drive unit 104 may function as hydraulic pump to recharge accumulator 118 with modulated hydraulic flow. After the accumulator 118 is fully charged and the aircraft is still in reverse motion, a pressure relief valve 121 may open to release excess flow/pressure. The reverse valve port 138 may begin to close as the hydraulic valve unit 116 slides toward neutral 133. Part of the flow may be bypassed back into flow path 128 and modulated between ports 133 and 134. The valve unit 116 may modulate the hydraulic flow during modulated-flow regenerative braking. Tail-tipping of the aircraft may be precluded during the regenerative braking because the main landing gear wheels may be allowed to rotate freely during the reverse braking. All hydraulic valves ports may return to park position after the aircraft comes to complete stop.

Figure 6:
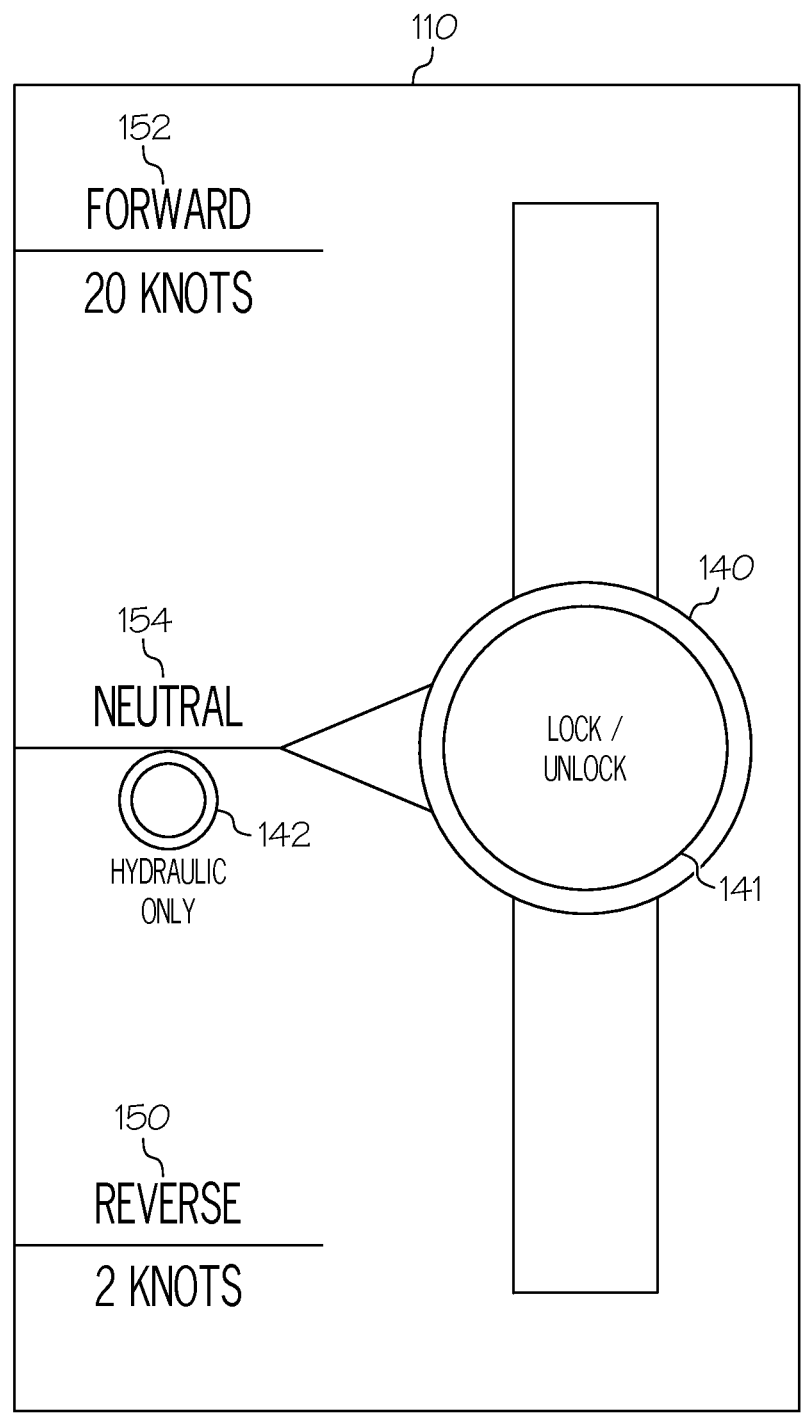
FIG. 6 is a plan view of a third configuration of a taxi control unit in FIG. 1 in accordance with an exemplary embodiment of the invention.

Referring particularly to FIG. 6, the taxi control unit 110 is shown in a configuration in which the aircraft may be ready to forward taxi. The control device 140 may be aligned with the PARK position 154. The valve unit 116 may be commanded to enter a park mode. The hydraulic pump 114 may be charging the accumulator 118.

Figure 7:
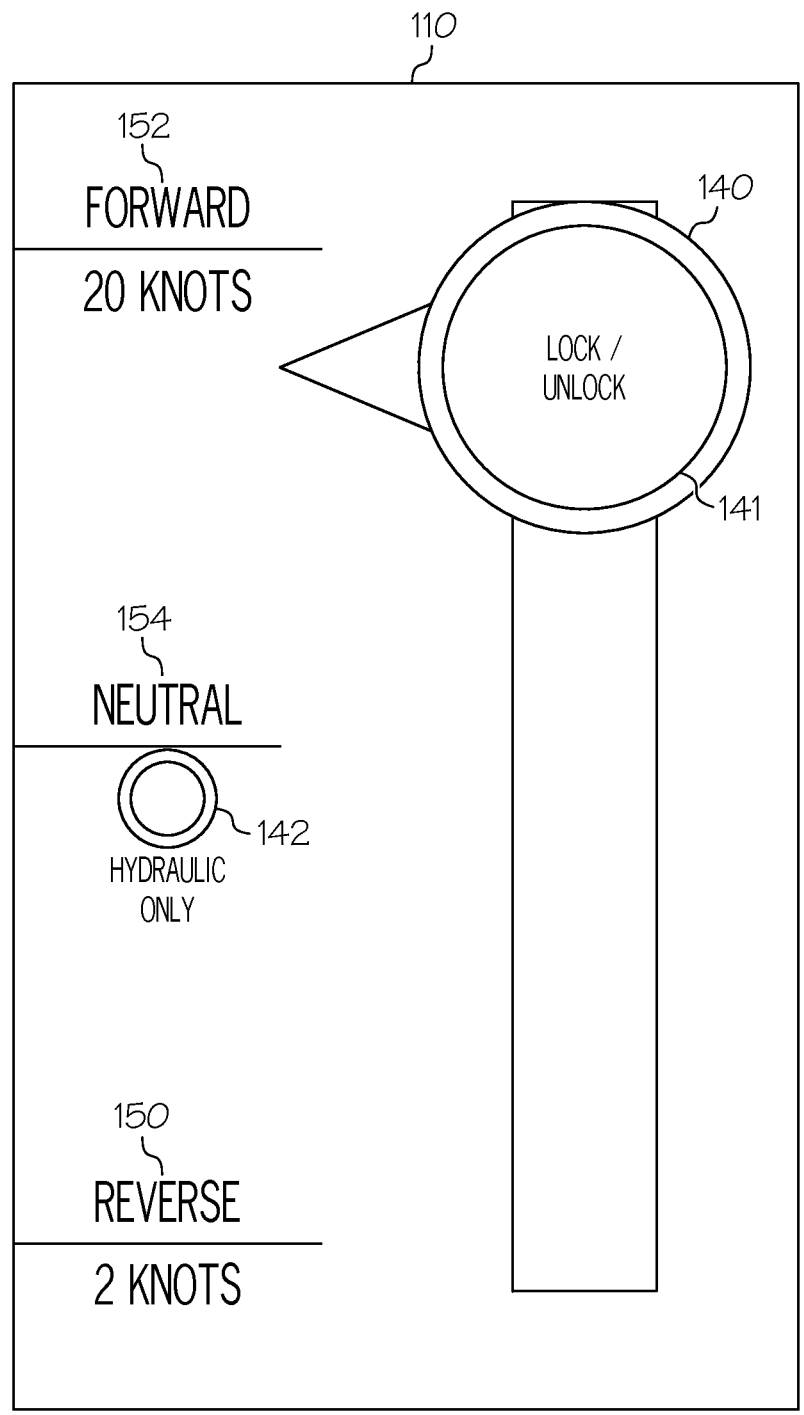
FIG. 7 is a plan view of a fourth configuration of a taxi control unit in FIG. 1 in accordance with an exemplary embodiment of the invention.

Referring particularly to FIG. 7, the taxi control unit 110 is shown in a configuration in which the aircraft may begin taxiing. The control device 140 may be moved toward the FORWARD position 152. The handle lock 141 may be released so that a nose wheel control signal on the signal system 120 is produced to engage the hydraulic clutch 104 on the nose wheel drive unit 104. A nose wheel control signal on the signal system 120 may be provided to command the valve unit 116 to provide forward rotation of the nose wheel drive unit 104. The valve unit 116 may modulate forward hydraulic flow according to traction control and position of the control device 140. Slippage detection may be performed by comparing speed vectors between nose and main gear wheels.

The hydraulic pump 114 may operate as required to maintain accumulator pressure. Hydraulic accumulator pressure set point may decrease with increasing forward taxi speed. The main gear wheel drive unit 102 may engage as speed increases. Once engaged, the drive unit 102 may respond to main gear control signals 112 to provide appropriate power corresponding to position of the control device 140. At forward speeds up to about 2 knots driving torque may be the sum of both the nose wheel drive unit 104 and the main gear wheel drive unit 102. When forward speed reaches about 2 knots, the valve unit 116 may be commanded to return to park position with the hydraulic clutch 105 disengaged. The control unit 110 may continue to provide control of forward taxi speed of the aircraft with taxi speed progressively increasing as the control device is moved progressively toward the forward position 152

Upon landing and taxiing to a gate, the handle lock 141 may remain in a locked position. Consequently, the aircraft may be taxied by employing only the main gear wheel drive unit. 102. The nose wheel drive unit 104 may not be required because there may be no need to produce high torque to overcome breakaway forces under these conditions.

In the event that there is a need to move the aircraft a short distance after the aircraft has come to a stop, the nose wheel drive unit 104 be activated by pushing the hydraulic-only selector button 142.

It should be understood, of course, that the foregoing relates to exemplary embodiments of the invention and that modifications may be made without departing from the spirit and scope of the invention as set forth in the following claims.

We claim:

1. An aircraft landing gear wheel-drive system, comprising:
   a first wheel drive unit for driving a first landing gear wheel of the aircraft; and
   a second wheel drive unit for driving a second landing gear wheel of the aircraft,
   wherein the first wheel drive unit has a first range of torque to speed (T/S) ratios,
   wherein the second wheel drive unit has a second range of T/S ratios,
   wherein the first range of T/S ratios is greater than the second range of T/S ratios,
   wherein the first wheel drive unit is a nose wheel drive unit,
   wherein the second wheel drive unit is a main gear wheel drive unit,
   wherein the first wheel drive unit includes a hydraulic motor, and
   wherein the second wheel drive unit includes one or more electric motors.

2. The drive system of claim 1 further comprising:
   a taxi control unit;
   the first wheel drive unit being controlled by the taxi control unit with first signals; and
   the second wheel drive unit being controlled by the taxi control unit with second signals.

3. The drive system of claim 1 wherein the first wheel drive unit includes a hydraulic clutch.

4. The drive system of claim 1 further comprising a flow-modulating valve unit coupled to the hydraulic motor.

5. The drive system of claim 1 further comprising an accumulator coupled to the hydraulic motor.

6. The drive system of claim 5 further comprising a hydraulic pump coupled to the accumulator.

7. The drive system of claim 1:
   wherein the first wheel drive unit has aircraft reversing capability; and
   wherein the second wheel drive unit does not have aircraft reversing capability.

8. The drive system of claim 1 wherein the first wheel drive unit has regenerative braking capability provided by the hydraulic motor acting as a pump.

* * * * *